(12) United States Patent
Frederick et al.

(10) Patent No.: US 7,227,814 B2
(45) Date of Patent: Jun. 5, 2007

(54) REPAIRABLE FIBER OPTIC HYDROPHONE ASSEMBLY

(75) Inventors: Donald A. Frederick, Simi Valley, CA (US); Joseph S. Salinas, Granada Hills, CA (US)

(73) Assignee: L-3 Communications Corporation, Sylmar, CA (US)

( * ) Notice: Subject to any disclaimer, the term of this patent is extended or adjusted under 35 U.S.C. 154(b) by 262 days.

(21) Appl. No.: 11/072,602

(22) Filed: Mar. 4, 2005

(65) Prior Publication Data

US 2006/0198246 A1   Sep. 7, 2006

(51) Int. Cl.
*G01B 9/02*   (2006.01)
*H04R 23/00*   (2006.01)

(52) U.S. Cl. .................................................. 367/149
(58) Field of Classification Search ............... 367/149; 385/12, 13; 250/227.14, 227.16, 227.17
See application file for complete search history.

(56) References Cited

U.S. PATENT DOCUMENTS 5,285,424 A    2/1994   Meyer ........................ 367/149
5,363,342 A   11/1994   Layton et al. ............... 367/149
6,288,975 B1   9/2001   Frederick et al. ........... 367/149
2003/0035344 A1*   2/2003   Maas et al. .................. 367/149
2006/0198246 A1*   9/2006   Frederick et al. ........... 367/149

\* cited by examiner

*Primary Examiner*—Dan Pihulic
(74) *Attorney, Agent, or Firm*—Roberts & Roberts, LLP

(57) ABSTRACT

A re-enterable end-to-end hydrophone assembly which is at least partially transparent, so that the routing of the hydrophone fibers is visible during all phases of assembly and operation. The inventive hydrophone assembly includes a cylindrical sensing mandrel with at least one optical fiber wrapped around its outer wall, and an at least partially transparent oil-filled reference housing attached to the sensing mandrel. The reference housing contains an internal support for holding at least one end of the optical fiber, as well as other hydrophone components such as input couplers, output couplers, and the like. The inventive hydrophone assemblies can be easily disassembled, repaired, and reassembled, facilitating recovery and reuse of expensive optical components.

24 Claims, 2 Drawing Sheets

REPAIRABLE FIBER OPTIC HYDROPHONE ASSEMBLY

BACKGROUND OF THE INVENTION

1. Field of the Invention

The present invention relates to hydrophones. More particularly, it relates to fiber optic hydrophone assemblies which can be easily taken apart and repaired, rather than being discarded when a defect arises.

2. Description of the Related Art

Hydrophones are well known in the art of acoustic sensing devices. Hydrophones are typically used in underwater operations, and are often configured into cylindrical shapes. During the assembly of conventional fiber optic hydrophones, optical fibers and other components are inserted into an inner chamber without the benefit of visual inspection. This process presents a risk of breakage and subsequent discarding of expensive assembly components. This process also makes diagnosis of sensor malfunctions difficult, since key components are often hidden from view. While components such as splices and couplers are typically tacked to the inside walls or other structures within this chamber, optical fibers must remain unrestrained to complete the insertion process. This causes the fibers to vibrate freely, and to impart a small acceleration sensitivity to the hydrophone device, which is only intended to be sensitive to acoustic pressure. This is particularly undesirable in applications where other sensors are used to sense the motion in the acoustic medium, and "crosstalk" among the sensors can reduce the fidelity of the sensing system.

Furthermore, cylindrically configured hydrophones also require optical fibers to pass into a cavity which is then sealed, to protect it from ambient pressure. These points of fiber penetration require small segments of the fiber to be embedded in stiff epoxies at points of high stress build-up, and are prone to breaking the fiber.

The present invention provides a solution to these problems. This invention provides a re-enterable, end-to-end hydrophone assembly which is at least partially transparent, so that the routing of the hydrophone fibers is visible during all phases of assembly and operation. This provides an advantage in that the hydrophone assembly can be easily disassembled, repaired, and reassembled.

The inventive assembly may be used in various applications, such as in producing hydrophones for use in towed arrays or bottom-mounted cables for undersea surveillance or surveys. This invention may be particularly useful in seismic applications, where large numbers of sensors are required, and where the cost and skill level of assembly operators is very high.

Several conventionally acoustic sensing assemblies are known. U.S. Pat. No. 5,363,342 teaches the use of concentric mandrels for fiber optic acoustic sensing. In particular, it describes two fiber-wrapped mandrels with a support mandrel between them. U.S. Pat. No. 5,285,424 also relates to concentric mandrels. It teaches a two-mandrel sensor without a support mandrel. Specifically, it teaches the use of two hollow concentric mandrels with a means for spacing them apart with a watertight, sealed cavity between them and a reference coil in the cavity. U.S. Pat. No. 6,288,975 teaches an end-to-end mandrel having a reduced diameter, a grooved flexible interlink, and hemispherically shaped end caps.

The present invention offers advantages over such known assemblies. For example, the related art offers only non-visible, closed assemblies, wherein hydrophone components are stuffed into mandrels thus risking breakage. This problem is solved by the present invention which offers an at least partially transparent reference housing which enables a user to view the inside of the assembly. The hydrophone assembly of the invention can be easily fabricated due to the full visibility of the fiber during fabrication. This also allows one to better control the component position and routing. Furthermore, the fabrication of the hydrophone assembly of the present invention can be made reversible. That is, the hydrophone assembly can be taken apart, repaired, and reassembled without having to scrap the expensive hydrophone components such as optical fibers and the like.

SUMMARY OF THE INVENTION

The invention provides a hydrophone assembly which comprises:
a) a sensing mandrel comprising a cylindrical housing having an elastically deformable outer wall defining a pressurized interior chamber, which sensing mandrel has first and second ends, wherein the second end comprises an exit port which is removably attachable to an end of a reference housing;
b) a reference housing comprising an at least partially transparent protective shell defining an inner chamber, which shell has an attachment end which is removably attached to the exit port of the sensing mandrel, a support within the inner chamber, and an openable access end;
c) the inner chamber of the reference housing being filled with a substantially incompressible fluid; and
d) at least one optical fiber which is wrapped around the outer wall of the sensing mandrel and which optical fiber comprises at least one end which extends into the reference housing such that the optical fiber end is present on the support within the reference housing.

The invention further provides a process for forming a hydrophone assembly which comprises:
a) providing a sensing mandrel comprising a cylindrical housing having an elastically deformable outer wall defining a pressurized interior chamber, which sensing mandrel has first and second ends, wherein the second end comprises an exit port which is removably attachable to an end of a reference housing;
b) providing a reference housing comprising an at least partially transparent protective shell defining an inner chamber, which shell has an attachment end which is removably attachable to the exit port of the sensing mandrel, a support within the inner chamber, and an openable access end;
c) attaching the sensing mandrel and the reference housing together;
d) wrapping a first optical fiber around the outer wall of the sensing mandrel, extending at least one end of the first optical fiber into the reference housing such that the optical fiber end is present on the support within the reference housing; and
e) filling the inner chamber of the reference housing with a substantially incompressible fluid.

The invention still further provides a process for repairing a hydrophone assembly which comprises:
i) providing a hydrophone assembly which comprises:
a) a sensing mandrel comprising a cylindrical housing having an elastically deformable outer wall defining a pressurized interior chamber, which sensing mandrel has first and second ends, wherein the second end comprises an exit port which is removably attachable to an end of a reference housing;

b) a reference housing comprising an at least partially transparent protective shell defining an inner chamber, which shell has an attachment end which is removably attached to the exit port of the sensing mandrel, a support within the inner chamber, and an openable access end;

c) the inner chamber of the reference housing being filled with a substantially incompressible fluid; and d) at least one optical fiber which is wrapped around the outer wall of the sensing mandrel and which optical fiber comprises at least one end which extends into the reference housing such that the optical fiber end is present on the support within the reference housing;

ii) detecting a defect of the hydrophone assembly, by observing the defect through the at least partially transparent protective shell of said reference housing;

iii) accessing the inner chamber of the reference housing;

iv) repairing the defect of the hydrophone assembly; and v) sealing the reference housing.

DETAILED DESCRIPTION OF THE PREFERRED EMBODIMENT

The invention relates to a repairable hydrophone assembly. The invention provides an end-to-end hydrophone assembly which generally comprises a sensing mandrel wrapped with at least one optical fiber, a reference housing attached to the sensing mandrel, and a support within the reference housing having a sensor placed thereon.

Figure 1:
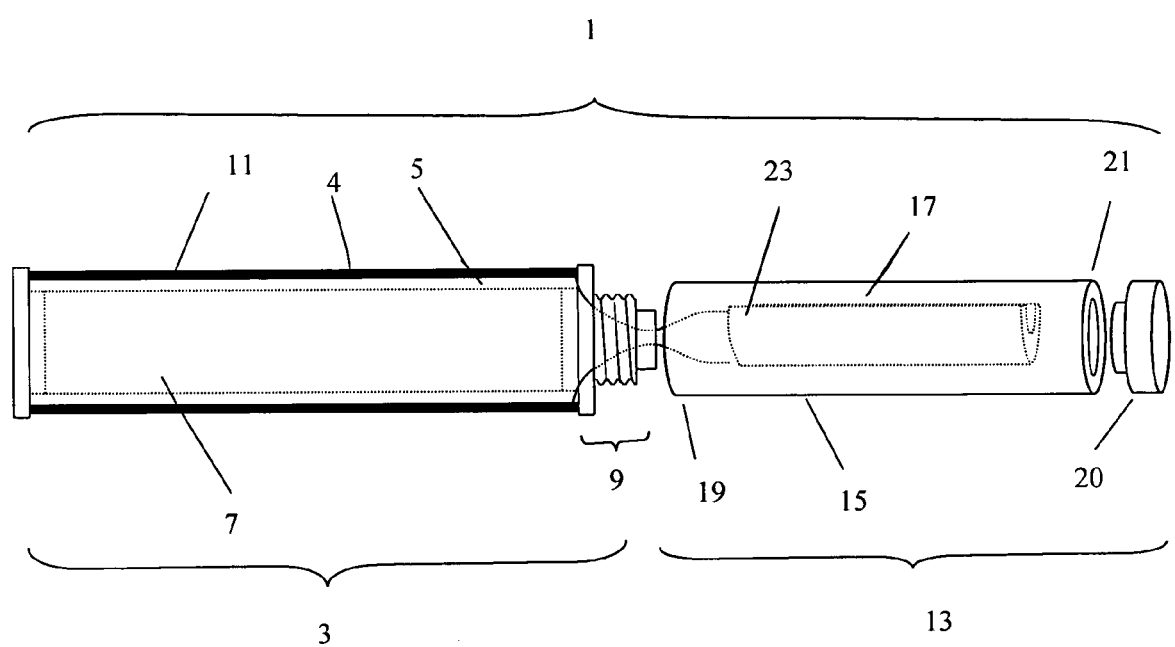
FIG. 1 shows a hydrophone assembly according to the invention.

FIG. 1 shows a hydrophone assembly 1 of the present invention. It comprises a sensing mandrel 3, which comprises a cylindrical housing 4 having an elastically deformable outer wall 5 defining a sealed interior chamber 7. The interior chamber 7 of the sensing mandrel 3 is preferably sealed to prevent external pressure from having any substantial effect on the pressure within the chamber. The sensing mandrel 3 has first and second ends, wherein at least one end comprises an exit port 9. The exit port 9 is preferably removably attachable to an end of a reference housing 13, described below. Most preferably, the exit port 9 of the sensing mandrel 3 comprises external threads, snap rings, or other known complementary surfaces or surface connectors such that the sensing mandrel may be removably attached to a complementary end of the reference housing 13.

The sensing mandrel 3 may comprise any suitable high strength material having a broad range of elastic deformation. Suitable materials nonexclusively include metals, plastics or the like. The sensing mandrel preferably comprises aluminum or polycarbonate.

The invention further includes a reference housing 13 comprising an at least partially transparent protective shell 15 defining an inner chamber 17. The protective shell 15 has an attachment end 19 and an openable access end 21. In a preferred embodiment, the attachment end 19 is removably attached to the exit port 9 of the sensing mandrel 3. The attachment end 19 of the reference housing 13 preferably comprises internal threads, snap rings, or other known complementary surfaces or surface connectors, which are removably attachable to the external threads, snap rings, or other known complementary surfaces or surface connectors of exit port 9 of the sensing mandrel 3. The openable access end 21 preferably comprises an end cap 20 which is attachable to the access end 21. The end cap 20 may comprise a material which is the same or different from the reference housing material, as described below.

The protective shell 15 of the reference housing 13 is at least partially transparent. In one preferred embodiment, the entire protective shell 15 is transparent. In another preferred embodiment, the protective shell 15 comprises a transparent window. The outer wall of the reference housing 13 is preferably elastically deformable, so that the pressure within the housing may be substantially the same as the outside ambient pressure. Suitable materials for the reference housing nonexclusively include metals, plastics, glass and the like. Preferably, the reference housing comprises polycarbonate.

Figure 2:
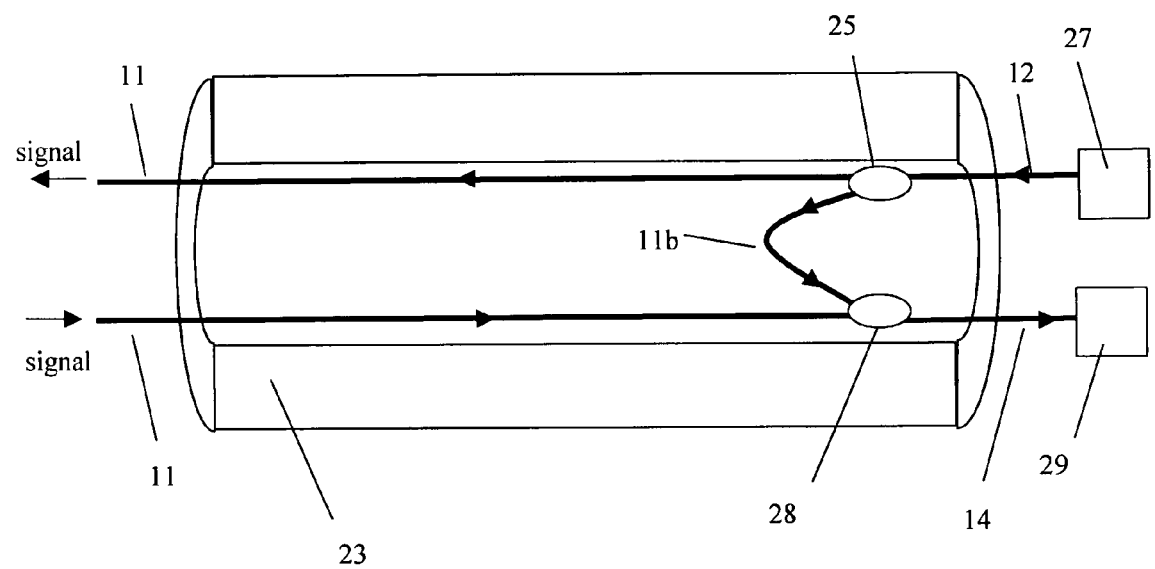
FIG. 2 shows a top view of a support having the optical fiber ends and the sensor supported thereon, wherein the sensor comprises a Mach-Zehnder interferometer.
Figure 3:
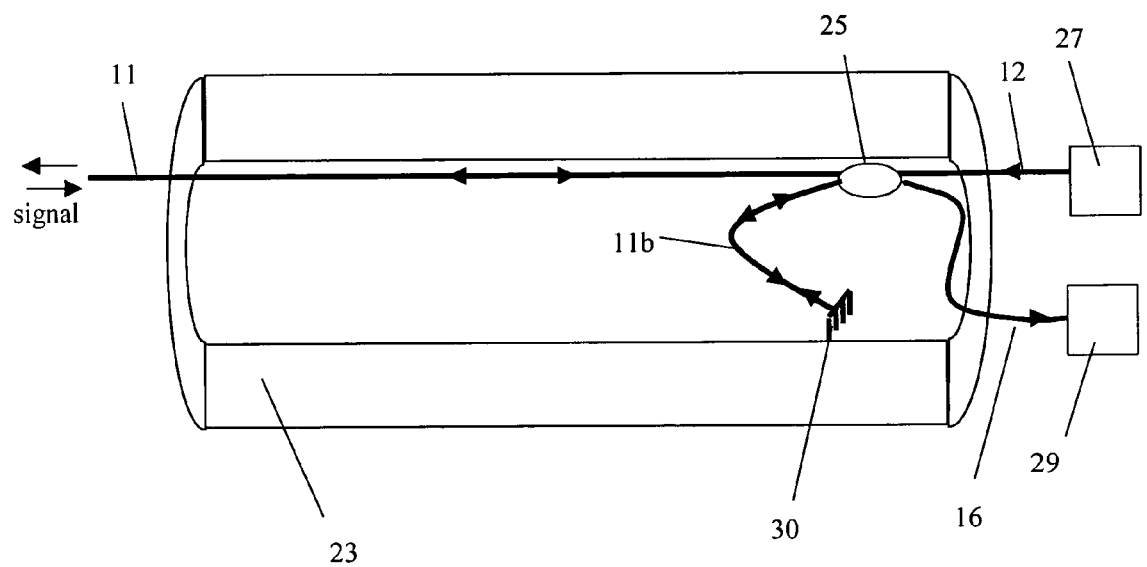
FIG. 3 shows a top view of a support having the optical fiber ends and the sensor supported thereon, wherein the sensor and fibers are arranged in an alternate configuration.

A support 23 is positioned within the inner chamber 17 of the reference housing 13. The support 23 may have any suitable shape which is capable of receiving and supporting hydrophone components such as optical fibers, splices, couplers, and the like. The support 23 preferably comprises a shelf, preferably an open, semicircular shelf, as shown in FIGS. 1 through 3.

The support 23 may or may not be fixedly attached to the reference housing 13, to exit port 9, and/or the sensing mandrel 3. Suitable materials for the support 23 nonexclusively include plastics, metals, and the like. In a preferred embodiment, the support 23 is at least partially transparent such that a user would more easily view any components present on the support, from outside of the reference housing 13.

The inner chamber 17 of the reference housing 13 is filled with a substantially incompressible fluid. This serves to equalize the pressure inside and outside the reference housing 13, preferably allowing the hydrophone assembly to withstand hydrostatic pressures of up to 3000 psi or more. By this means, optical fibers which pass from outside the reference housing to its interior at the exit port 9 or access end 21 need not penetrate a rigid seal required to support large pressure gradients and concomitant large stresses that could impart strain to the fiber and damage it. Suitable incompressible fluids nonexclusively include mineral oil, castor oil, water, and the like. The incompressible fluid preferably comprises mineral oil.

At least one optical fiber, referred to here as a first optical fiber 11, having a pair of ends, is wrapped around the outer wall 5 of the sensing mandrel 3 as shown in FIG. 1. The first optical fiber 11 is preferably not contained within the pressurized chamber 7 of the sensing mandrel. In one preferred embodiment, an end of the first optical fiber 11 enters the outer wall 5 without penetrating the chamber 7 and then exits the outer wall 5 at exit port 9. Such may be done using any suitable method, such as via exit holes or slots or the like, which may be formed into the outer wall 5 of the sensing mandrel 3. This end of the at least one first optical fiber 11 then extends into the inner chamber 17 of reference housing 13 through the attachment end 19 such that the fiber end is present on the support within the reference housing 13.

The first optical fiber 11 is then preferably attached to the support 23 within the reference housing 13. In a preferred embodiment, the first optical fiber 11 is secured to the support 23 with a securing composition. The securing composition preferably comprises a soft sealant or the like which can be removed and which presents little risk of stressing and breaking the first optical fiber 11. Suitable materials for the securing composition nonexclusively include silicone rubber, such as RTV silicone rubber, and the like. In one preferred embodiment, the securing composition is present at the exit port 9 of the sensing mandrel 3 such that the first optical fiber 11 is encapsulated with the securing composition as it passes through the exit port 9. In another preferred embodiment, a securing composition is present at the attachment end 19 of the reference housing 13 such that the first optical fiber 11 is encapsulated with the securing composition as it enters the reference housing 13.

Suitable materials for the optical fiber or fibers are well known in the art and nonexclusively include glass or polymeric materials. The optical fiber or fibers preferably have a diameter of from about 50 micrometers to about 125 micrometers, and most preferably about 80 micrometers. Suitable optical fibers non-exclusively include Micro 1550-17-GyroSil, commercially available from Polymicro Technologies.

As shown in FIGS. 2 and 3 the invention preferably includes an input coupler 25 on the support 23, which input coupler 25 is attached by means of optical fiber section 12 extending through the access end of the protective shell 15 of the reference housing to an input source 27. Any "optical fiber section" of the present invention may comprise a section of an existing optical fiber, or sections of an additional optical fiber. The input coupler 25 is also attached to a first end of a first optical fiber 11. The input coupler 25 thus receives an input signal from the input source, and applies at least a portion of the input signal to the first end of the first optical fiber 11.

FIG. 2 depicts and embodiment wherein the invention includes an output coupler 28 on the support 23, which output coupler 28 is attached to and receives a sensing signal from a second end of the first optical fiber 11. The sensing signal is responsive to both the input signal and an acoustical pressure exerted on the outer wall of the sensing mandrel. The output coupler 28 also receives a reference signal derived via a transmission through a second optical fiber 11b. In this embodiment, the second optical fiber 11b receives a portion of the input signal directly from the input coupler 25. This second optical fiber 11b may serve to substantially preserve the input signal for subsequent comparison with the portion of the input signal applied to the first optical fiber 11. It is preferred that the second optical fiber 11b is wholly contained within the reference housing, and therefore isolated from the environment to which the first optical fiber wrapped around the sensing mandrel is exposed.

The output coupler 28 is attached by means of an optical fiber section 14 to an output device 29, such that the output coupler 28 compares the reference signal to the sensing signal, and generates an output signal on the output device responsive to a comparison between the input signal and the sensing signal. As stated above, an "optical fiber section" may comprise a section of an existing optical fiber, or a section of an additional optical fiber.

The input coupler and/or the output coupler may independently form a part of an interferometer or a reference coil or the like. Examples of suitable interferometer configurations nonexclusively include Mach-Zehnder interferometers, Michelson interferometers, interferometers comprising photonic crystals, and the like. Such are well known in the art.

In another preferred embodiment of the invention, depicted in FIG. 3, the hydrophone assembly comprises a first optical fiber 11 having a pair of ends, wherein only one of the fiber's ends extends into the inner chamber of the reference housing and is attached to the support 23 within the reference housing. In this embodiment, a second optical fiber 11b having a pair of ends may be attached to the support 23 within the reference housing. This second optical fiber 11b has an end attached to the input coupler 25 to receive therefrom a portion of the input signal, and this second optical fiber 11b serves to substantially preserve the input signal for subsequent comparison with the portion of the input signal applied to the first optical fiber 11.

In this alternate configuration of the invention, a second end of the first optical fiber 11, and a second end of the second optical fiber 11b are not attached to a second coupler. Rather, the second end of the second fiber 11b is formed into a reflective surface 30, and the second end of the first optical fiber 11 either leads to or is formed into a reflective surface. These reflective surfaces return counter-propagating reference and sensing signals back to the input coupler 25. The input coupler 25 compares the reference signal to the sensing signal, and generates a counter-propagating output signal that is delivered to the output device 29 by means of an optical fiber section 16. As stated above, this "optical fiber section" may comprise a section of an existing optical fiber, or a section of an additional optical fiber. In an alternate embodiment, reflective surface 30 is formed from a termination of second fiber 11b, wherein the second fiber and its termination are wholly contained within input coupler 25.

An additional embodiment of the invention includes the formation of a seal around an end of the optical fibers extending through the reference housing, which fibers connect the coupler or couplers to the input source and the output device. The seal can be subsequently removed in such a manner that the fiber end, input source and output device can be withdrawn without damage.

The various components of this hydrophone assembly may be connected via electrical wires and/or optical fibers and the like.

A key feature of the inventive hydrophone assembly is that that it may be repaired without requiring the replacement and/or disposal of expensive hydrophone components. Once a hydrophone assembly is formed according to the present invention, it may be inspected for defects. According to the invention, a present defect of the hydrophone assembly may be detected by observing the defect through the at least partially transparent protective shell 15 of said reference housing 13. In one preferred embodiment, this is done by directing a beam of light through the first optical fiber 11 such that a defect of the hydrophone assembly 1 is indicated by a discontinuity in the beam of light passing through the fiber 11.

The inner chamber 17 of the reference housing 13 is then accessed using any suitable method, such as by entering the openable access end 21 or by removing the protective shell 15 from the attachment end 19, providing access to all components in the inner chamber 17 for repair. In one embodiment of the invention, accessing the inner chamber of the reference housing includes a process that in part comprises removing any seals that compose the interior chamber of the reference housing. Since the interior of the inner chamber 17 is filled with a substantially incompressible fluid which maintains pressure equalization between the interior and exterior of the chamber, these seals merely restrict fluid migration between regions of substantially equal pressure. As such, they need not be mechanically very rigid, and are easily removed and replaced.

Once the housing is accessed, the defect of the hydrophone assembly is then repaired, and the reference housing 13 is re-sealed.

The hydrophone assemblies of the present invention may be used in various commercial, military, or other operations. The invention relates to end-to-end cylindrical assemblies, intended to be deployed in cables that can have stiff sections several inches long. Thus, the reeling diameters are limited in how small they can be. The invention is of particular use in producing hydrophones for bottom-mounted cables for undersea surveillance or survey work. This may be especially useful in seismic applications, where large numbers of sensors are required, and the cost and skill level of the assembly operators is a major commercial concern in producing such assemblies.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A hydrophone assembly which comprises:
   a) a sensing mandrel comprising a cylindrical housing having an elastically deformable outer wall defining a pressurized interior chamber, which sensing mandrel has first and second ends, wherein the second end comprises an exit port which is removably attachable to an end of a reference housing;
   b) a reference housing comprising an at least partially transparent protective shell defining an inner chamber, which shell has an attachment end which is removably attached to the exit port of the sensing mandrel, a support within the inner chamber, and an openable access end;
   c) the inner chamber of the reference housing being filled with a substantially incompressible fluid; and
   d) at least one optical fiber which is wrapped around the outer wall of the sensing mandrel and which optical liber comprises at least one end which extends into the reference housing such that the optical fiber end is present on the support within the reference housing.

2. The hydrophone assembly of claim 1 further comprising an input coupler on the support, which input coupler is attached to an input source via an optical fiber section extending through the access end of the protective shell of the reference housing, from which input source the input coupler receives an input signal, which input coupler is attached to an end of the at least one optical fiber, and which input coupler applies a portion of the input signal to the optical fiber end.

3. The hydrophone assembly of claim 2 comprising a first optical fiber having a pair of ends, with each of the first optical fiber ends extending through the outer wall at the second end of the sensing mandrel without penetrating into the pressurized interior chamber, wherein the fiber ends then extend out of the sensing mandrel through the exit port, wherein the fiber ends extend into the inner chamber of the reference housing through the attachment end, and wherein the fiber is attached to the support within the reference housing; and a second optical fiber having a pair of ends, which second optical fiber is attached to the support within the reference housing, which second fiber has an end attached to the input coupler to receive therefrom a portion of the input signal, and which second fiber serves to substantially preserve the input signal for subsequent comparison with the portion of the input signal applied to the first optical fiber.

4. The hydrophone assembly of claim 2 comprising a first optical fiber having a pair of ends, wherein one of the first optical fiber ends extends through the outer wall at the second end of the sensing mandrel without penetrating into the pressurized interior chamber, which first optical fiber end then extends out of the sensing mandrel through the exit port, wherein the first optical fiber end extends into the inner chamber of the reference housing through the attachment end and is attached to the support within the reference housing; and a second optical fiber having a pair of ends, which second optical fiber is attached to the support within the reference housing, which second fiber has an end attached to the input coupler to receive therefrom a portion of the input signal, and which second fiber serves to substantially preserve the input signal for subsequent comparison with the portion of the input signal applied to the first optical fiber.

5. The hydrophone assembly of claim 3 which further comprises an output coupler on the support which output coupler is attached to and receives a sensing signal from an end of the first optical fiber, which sensing signal is responsive to both the input signal and an acoustical pressure exerted on the outer wall of the sensing mandrel, and which output coupler also receives a reference signal from an end of the second optical fiber; which output coupler is attached to an output device and wherein the output coupler compares the reference signal to the sensing signal and generates an output signal on the output device responsive to a comparison between the input signal and the sensing signal.

6. The hydrophone assembly of claim 1 which comprises an interferometer.

7. The hydrophone assembly of claim 1 which comprises a Mach-Zehnder interferometer or a Michelson interferometer.

8. The hydrophone assembly of claim 5 wherein the input source and/or the output device comprises an optical fiber and/or electrical wire.

9. The hydrophone assembly of claim 1 wherein the exit port of the sensing mandrel and the attachment end of the reference housing comprise complementary threads, snap rings, or complementary surfaces such that the sensing mandrel and the reference housing are removably attachable.

10. The hydrophone assembly of claim 1 wherein said sensing mandrel comprises a material selected from the group consisting of plastics, metals, and combinations thereof.

11. The hydrophone assembly of claim 1 wherein the support is at least partially transparent.

12. The hydrophone assembly of claim 1 wherein said support comprises a material selected from the group consisting of plastics, metals and combinations thereof.

13. The hydrophone assembly of claim 1 wherein the reference housing comprises a material selected from the group consisting of plastics, metals and combinations thereof.

14. The hydrophone assembly of claim 1 wherein said incompressible fluid of the reference housing is selected from the group consisting of mineral oil, castor oil, and water.

15. A process for forming a hydrophone assembly which comprises:
   a) providing a sensing mandrel comprising a cylindrical housing having an elastically deformable outer wall defining a pressurized interior chamber, which sensing mandrel has first and second ends, wherein the second end comprises an exit port which is removably attachable to an end of a reference housing;
   b) providing a reference housing comprising an at least partially transparent protective shell defining an inner chamber, which shell has an attachment end which is removably attachable to the exit port or the sensing mandrel, a support within the inner chamber, and an openable access end;
   c) attaching the sensing mandrel and the reference housing together;
   d) wrapping a first optical fiber around the outer wall of the sensing mandrel, extending at least one end of the first optical fiber into the reference housing such that (the optical fiber end is present on the support within the reference housing; and
   e) filling the inner chamber of the reference housing with a substantially incompressible fluid.

16. The process of claim 15 which further comprises the step of, prior to step (e), providing an input coupler on the support, which input coupler is attached to an input source via an optical fiber extending through the access end of the protective shell of the reference housing, from which input source the input coupler is capable of receiving an input signal, which input coupler is attached to a first end of the first optical fiber, and which input coupler is capable of applying a portion of the input signal to the end of the first optical fiber.

17. The process of claim 16 which further comprises the step of, prior to step (e), providing a second optical fiber which is capable of receiving a portion of the input signal from the input coupler, and which second optical fiber is contained within the reference housing.

18. The process of claim 17 which further comprises the step of, prior in step (e), providing an output coupler on the support, which output coupler is attached to and is capable of receiving a sensing signal from a second end of the first optical fiber wrapped around the outer wall of the sensing mandrel, which sensing signal is responsive to both the input signal and an acoustical pressure exerted on the outer wall of the sensing mandrel, and which output coupler also is capable of receiving a reference signal from an end of the second optical fiber; which output coupler is attached to an output device and wherein the output coupler is capable of comparing the reference signal to the sensing signal and generating an output signal on the output device responsive to a comparison between the input signal and the sensing signal.

19. The process of claim 17 which further comprises the step of encapsulating the optical fibers within a securing composition after step (d) but prior to step (e).

20. The process of claim 17 which further comprises the step of securing the optical fibers to the support with a securing composition.

21. A process for repairing a hydrophone assembly which comprises:
   i) providing a hydrophone assembly which comprises:
      a) a sensing mandrel comprising a cylindrical housing having an elastically deformable outer wall defining a pressurized interior chamber, which sensing mandrel has first and second ends, wherein the second end comprises an exit port which is removably attachable to an end of a reference housing;
      b) a reference housing comprising an at least partially transparent protective shell defining an inner chamber, which shell has an attachment end which is removably attached to the exit port of the sensing mandrel, a support within the inner chamber, and an openable access end;
      c) the inner chamber of the reference housing being filled with a substantially incompressible fluid; and
      d) at least one optical fiber which is wrapped around the outer wall of the sensing mandrel and which optical fiber comprises at least one end which extends into the reference housing such that the optical fiber end is present on the support within the reference housing;
   ii) detecting a defect of the hydrophone assembly, by observing the defect through the at least partially transparent protective shell of said reference housing;
   iii) accessing the inner chamber of the reference housing;
   iv) repairing the defect of the hydrophone assembly; and
   v) sealing the reference housing.

22. The process of claim 21 wherein step (ii) comprises the step of directing a beam of light through the at least one optical fiber such that a defect of the hydrophone assembly is indicated by a discontinuity in the beam of light passing through the fiber within the reference housing.

23. The process of claim 15 which further comprises the step of encapsulating the first optical fiber within a securing composition after step (d) but prior to step (e).

24. The process of claim 15 which further comprises the step of securing the first optical fiber to the support with a securing composition.

* * * * *